(12) United States Patent
Burgan et al.

(10) Patent No.: US 7,274,169 B2
(45) Date of Patent: Sep. 25, 2007

(54) METHOD AND APPARATUS FOR REMINDING A USER OF AN UNATTENDED DEVICE IN A VEHICLE

(75) Inventors: John M. Burgan, North Palm Beach, FL (US); Joseph Patino, Pembroke Pines, FL (US); Russell L. Simpson, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/167,886

(22) Filed: Jun. 27, 2005

(65) Prior Publication Data

US 2006/0290319 A1    Dec. 28, 2006

(51) Int. Cl.
*H01H 10/46*    (2006.01)

(52) U.S. Cl. .................................................. 320/107
(58) Field of Classification Search ................ 320/104, 320/107, 114, 115
See application file for complete search history.

(56) References Cited

U.S. PATENT DOCUMENTS 2,773,249 A  *  12/1956  De Santis ................... 340/457
3,484,569 A  *  12/1969  Euston ..................... 200/43.08

\* cited by examiner

*Primary Examiner*—Edward H Tso

(57) ABSTRACT

A device (100) has a charging system (102) for coupling to a charger (103) operating in a vehicle, and a processor coupled to the charging system. The processor is programmed to detect (202) a charging state while a user of the device is operating the vehicle, and detect (204-208) an act by the user to exit the vehicle.

15 Claims, 2 Drawing Sheets

METHOD AND APPARATUS FOR REMINDING A USER OF AN UNATTENDED DEVICE IN A VEHICLE

FIELD OF THE INVENTION

This invention relates generally to battery charging systems, and more particularly to a method and apparatus for reminding a user not to leave a device unattended in a vehicle.

BACKGROUND OF THE INVENTION

A large number of portable device users (such as cell phone users) attach their phone to a charger or accessory holder in an automobile while in transit. Often, however, end users fail to remember to take their phone with them upon departing their automobile. Leaving the phone in the automobile unattended can lead to theft, an inconvenience for the end user when a need arises to use the phone, and/or failure to respond to calls.

SUMMARY OF THE INVENTION

Embodiments in accordance with the invention provide a method and apparatus for reminding a user not to leave a device unattended in a vehicle.

In a first embodiment of the present invention, a device has a charging system for coupling to a charger operating in a vehicle, and a processor coupled to the charging system. The processor is programmed to detect a charging state while a user of the device is operating the vehicle, and detect an act by the user to exit the vehicle.

In a second embodiment of the present invention, a computer-readable storage medium operates in a device having a charging system for coupling to a charger operating in a vehicle. The storage medium has computer instructions for detecting a charging state while a user of the device is operating the vehicle, and detecting an act by the user to exit the vehicle.

In a third embodiment of the present invention, a method in a device has a charging system for coupling to a charger operating in a vehicle. The method has the steps of detecting a charging state while a user of the device is operating the vehicle, and detecting an act by the user to exit the vehicle. Note, the vehicle is not necessarily limited to an automobile, but can include boats, planes, or other means of transportation where a user is likely to carry a device that can be charged within the vehicle.

DETAILED DESCRIPTION

Figure 1:
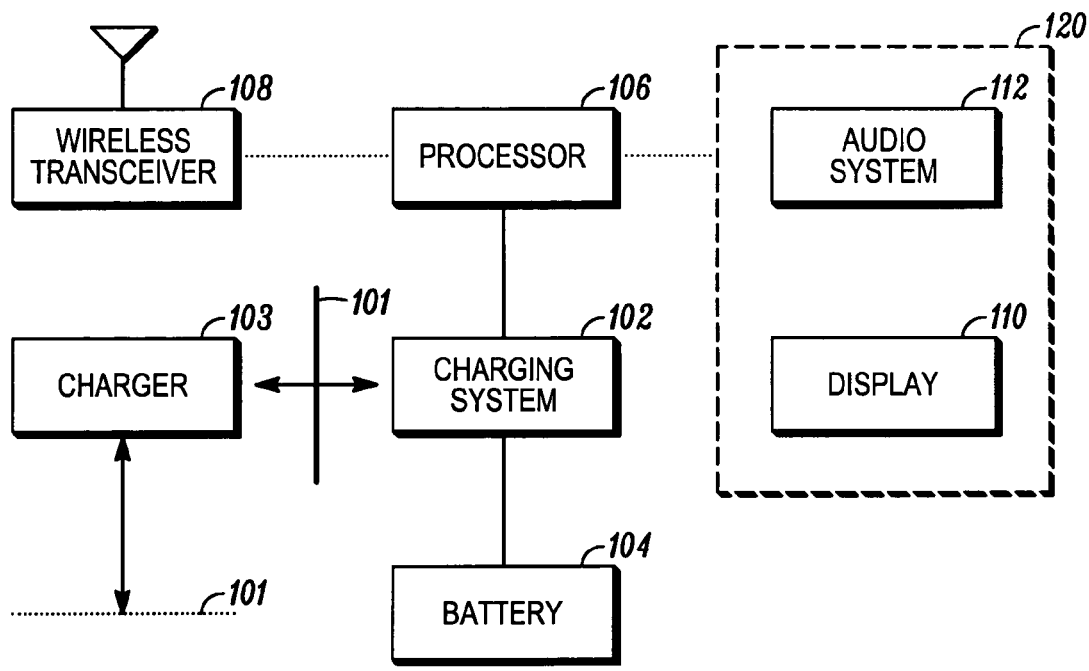
FIG. 1 is a block diagram of a device in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is a block diagram of a device 100 in accordance with an embodiment of the present invention. The device 100 comprises a charging system 102 coupled to a battery 104 having one or more conventional rechargeable battery cells, and a processor 106 coupled to the foregoing components for controlling operations thereof. The processor 106 includes conventional computing technology such as a microprocessor, and/or a DSP (Digital Signal Processor). Additionally, the processor 106 can include one or more storage devices such as Random Access Memory, Read Only Memory, Flash, or other conventional storage media devices singly or in combination.

The charging system 102 includes, for example, a conventional regulation circuit (not shown) with conventional charge pumps if needed. The charging system 102 is coupled to the cells 104 for supplying an adjustable source voltage and source current for charging said cells 104. To enable charging of the battery 104, a conventional charger 103 is coupled to the charging system 102. Once the charger 103 is removed, charging of the battery 104 is no longer possible. The battery 104 can be of any technology (e.g., Lithium Ion) having a reasonable charge capacity (e.g., 850 milli-ampere hours) for repeatable use of the device 100 throughout the course of the day.

In a supplemental embodiment, the device 100 can include a conventional wireless transceiver 108 for exchanging messages with a communication system, a conventional display 110 (e.g., Liquid Crystal Display—LCD) for conveying interactive images to a user of the device 100, and an audio system 112 for exchanging audible signals with the user. The display 110 and audio system 112 can function as an alerting device 120 as will be described below. It would be obvious to an artisan with skill in the art that other embodiments of the alerting means are possible such as, for example, a vibrator carried by the device 100, an alerting mechanism such as an audible and/or visual alert in the charger 103 or the automobile (e.g., flashing headlights, car horn, console audible and/or light alerts, etc.) activated by the device 100 (through an interface 101 to be described below) in accordance with the invention as described herein. Accordingly, any present or future means for alerting an end user of the device 100 that can be adapted to the present invention is intended to be within the spirit of the claims described herein.

As noted above, the charging system 102 can be coupled to a conventional charger 103. The charger 103 can be an integral unit permanently affixed as an accessory to a vehicle such as an automobile. The accessory can be, for instance, a receptacle for engaging with a cell phone for charging purposes and other functions such as hands-free operations, location services or other available functions. Alternatively, the charger 103 can be an accessory independent of the automobile, which can be coupled thereto by way of conventional means (e.g., a cigarette lighter). In either embodiment, the automobile provides an interface 101 for charging and potentially other functions.

For instance, in modern automobiles, the interface 101 (depicted by a solid line) can represent a sophisticated signaling interface that provides one or more signaling states of the automobile. Said interface 101 can be in part a wired connection and in part a wireless connection using a short-range wireless technology such as Bluetooth™. This interface 101 can supply signals from an integrated charger 103 of the automobile along with state signals indicating the operating state of the automobile. In an embodiment where the charger 103 is not an integral accessory of the automobile, the charger 103 is coupled to the interface 101 (represented by the dash line). In this instance, the charger 103 sits between the device 100 and the automobile interface 101 and coupling to both items.

From the foregoing embodiments, it should be evident that the device 100 can represent any number of device functions including, for instance, a cell phone, a gaming device, a PDA (Personal Digital Assistant), or other device that is portable and operates according to the present invention.

Figure 2:
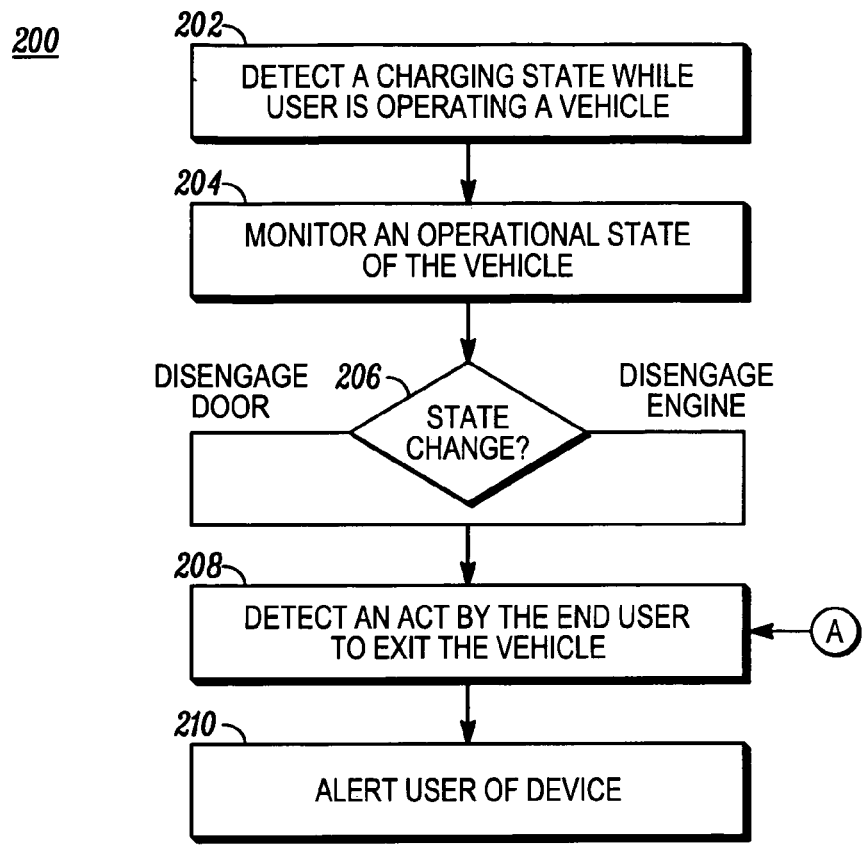
FIGS. 2-4 are flowcharts depicting a method operating in the device for detecting a departure of a user from a vehicle in accordance with an embodiment of the present invention.
Figures 3, 4:
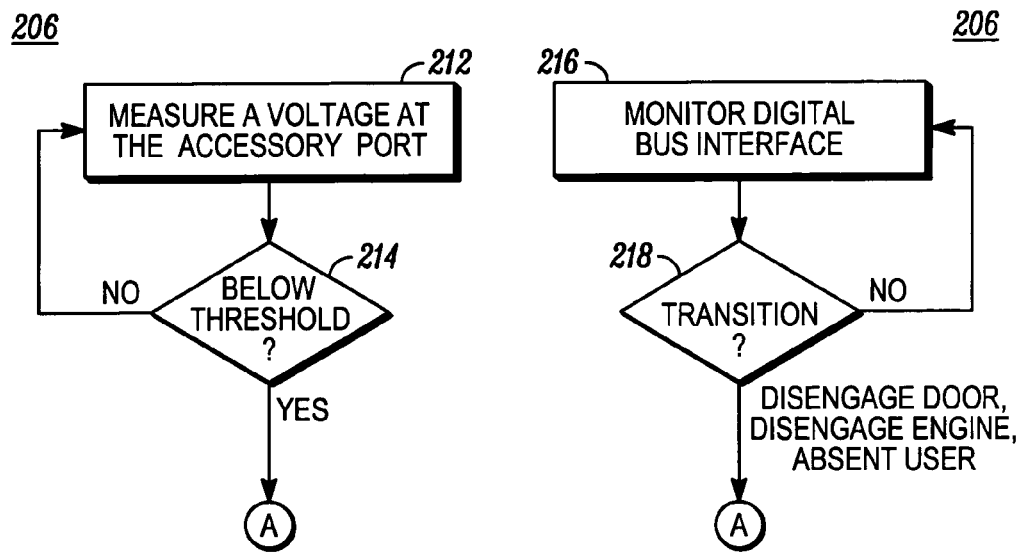

FIGS. 2-4 are flowcharts depicting a method 200 operating in the device 100 for detecting a departure of a user from a vehicle in accordance with an embodiment of the present invention. Method 200 begins with step 202 where the device 100 detects a charging state while a user is operating an vehicle. This step can represent an action by the user to couple the device 100 to the interface 101 of the vehicle while the vehicle engine is engaged. In step 204 the device 100 monitors an operational state of the vehicle.

The operational state can be any number of embodiments including an engaged state of an automobile engine, a disengaged state of the automobile engine, an opened state of a door of the automobile, a closed state of the door the automobile, a presence state of the user in the automobile, and/or an absence state of the user in the automobile. In the latter two embodiments, the presence or absence of the user can be detected by any conventional means such as for instance one or more sensors included in the seats of the automobile to detect the user's presence (commonly used to remind users to wear their seat belt).

In step 206 the device 100 checks for a state change in the operation of the vehicle. FIG. 2 illustrates by way of example two possible state changes that can be detected by the present invention. It would be obvious to an artisan with skill in the art that any operational state of the vehicle that can provide an indication that the user is exiting the vehicle is within the scope and spirit of the claims described herein. Bearing in mind that the state changes shown in FIG. 2 are exemplary, the device 100 proceeds to step 206 where it detects a disengaged door and/or disengaged engine. FIGS. 3 and 4 provide illustrations of how these state transitions can be detected in step 206 according to embodiments of the present invention.

In FIG. 3, the device 100 measures in step 212 a voltage at an accessory port (such as cigarette lighter) of the vehicle. This voltage can be used to determine the state of the engine. For example, when an automobile engine is engaged, the alternator provides a charge voltage to the battery of the automobile at a higher than normal voltage (e.g., 13.4V). When the engine is disengaged, this voltage drops to the level provided by the battery (e.g., 12.6V). In step 214, the device 100 checks for this drop in voltage on the basis of a pre-established voltage threshold (e.g., 13V). If the voltage is the threshold, then the automobile engine is assumed to be engaged, which under most conditions infers to the device 100 that the user remains in the automobile. Under this condition, the device 100 continues to monitor the voltage in step 212.

If the voltage falls below the threshold, the device 100 assumes the engine has been disengaged by the user of the device 100, and proceeds to step 208 where it recognizes that the user has performed an act for exiting the vehicle. The device 100 then proceeds to step 210 and asserts an alert to remind the user not to leave the device 100 behind or at least not in the open. The alert can be audible alert (such as a sequence of rings or tones) provided by the audio system 112, and/or a visual alert conveyed by the display 110. As noted above the alert means can be any present and future means capable of stimulating one or more human senses, which when adapted to the present invention, operates according to method 200.

In an alternative embodiment shown in FIG. 4, the device 100 can monitor a sophisticated wired (or wireless) interface 101 providing signals that indicate the operating state of the vehicle. In steps 216 and 218 these states are monitored for transitions such as, for instance, a transition from an engaged door of the driver of the vehicle to a disengaged state, and/or a transition from an engaged engine to a disengaged state. As before, when the disengaged state of the door and/or engine is detected, the device 100 proceeds to steps 208 and 210 to alert and remind the user of the device 100 not to leave the device unattended.

It should be evident to the reader that the present invention can be realized in hardware, software, or a combination of hardware and software. Thus, the present invention can be embedded in a computer program product, which comprises all the features enabling the implementation of the methods described herein, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the present invention may be used in many arrangements. Thus, although the description is made for particular arrangements and methods, the intent and concept of the invention is suitable and applicable to other arrangements not described herein. For example, the embodiments of step 206 can be combined for contemporaneous monitoring of multiple state transitions to increase the intelligibility of the device 100 in detecting an exiting act by the user. It would be clear therefore to those skilled in the art that modifications to the disclosed embodiments described can be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description are to be construed to be inclusive of the scope of the invention as defined in the following claims. Thus, reference should be made to the following claims, rather than to the foregoing specification, as indicating the scope of the invention.

What is claimed is:

1. A device, comprising:
 a charging system for coupling to a charger operating in a vehicle; and
 a processor coupled to the charging system, wherein the processor is programmed to:
   detect a charging state while a user of the device is operating the vehicle;
   detect an act by the user to exit the vehicle;
   monitor an operational state of the vehicle; and
   detect the act by the user to exit the vehicle according to the operational state of the vehicle;
 wherein the charging system is coupled to an interface of the vehicle, and wherein the processor is further programmed to:
   monitor an operational state of the vehicle; and detect the act by the user to exit the vehicle according to the operational state of the vehicle wherein the interface comprises an accessory port of the vehicle, and wherein the processor is further programmed to monitor a transition from an engagement state to a disengaged state of a vehicle engine as an indication of the act by the user to exit the vehicle.

2. The device of claim 1, wherein the interface comprises at least one among a hard-wired interface and a wireless interface.

3. The device of claim 2, wherein the operational state comprises at least one among an engaged state of an automobile engine, a disengaged state of the automobile engine, an opened state of a door of an automobile, a closed state of the door of the automobile, a presence state of the user in the automobile, and an absence state of the user in the automobile.

4. The device of claim 1, wherein the interface comprises one among an accessory port of the vehicle, and a signaling interface providing one or more signaling states of the vehicle.

5. The device of claim 1, wherein the charger comprises one among a portable charger for coupling to an accessory port of the vehicle, and a permanently affixed accessory of the vehicle for coupling to the device.

6. The device of claim 1, wherein the processor is programmed to:

measure a voltage at the accessory port; and detect the disengaged state of the vehicle engine upon the voltage falling below a threshold.

7. The device of claim 1, comprising an alerting means, wherein the processor is programmed to:

monitor an engagement state of the charging system with the charger; and alert the user when the act of departure is detected and the device remains engaged with the charger.

8. The device of claim 1, wherein the processor is programmed to monitor from the interface a transition from a closed state of a door in the vehicle to an open state of the door as an indication of the act by the user to exit the vehicle.

9. The device of claim 1, comprising a wireless transceiver, wherein the processor is programmed to exchange messages of the user with a communication system.

10. A computer-readable storage medium in a device having a charging system for coupling to a charger operating in a vehicle, comprising computer instructions for:

detecting a charging state while a user of the device is operating the vehicle; and detecting an act by the user to exit the vehicle;

wherein the charging system is coupled to an interface of the vehicle, and wherein the storage medium further comprises computer instructions for:

monitoring an operational state of the vehicle; and detecting the act by the user to exit the vehicle according to the operational state of the vehicle;

wherein the interface further comprises an accessory port of the vehicle, and wherein the storage medium comprises computer instructions for monitoring a transition from an engagement state to a disengaged state of a vehicle engine as an indication of the act by the user to exit the vehicle.

11. The storage medium of claim 10, wherein the interface comprises at least one among a hard-wired interface and a wireless interface.

12. The storage medium of claim 11, wherein the operational state comprises at least one among an engaged state of an automobile engine, a disengaged state of the automobile engine, an opened state of a door of an automobile, a closed state of the door of the automobile, a presence state of the user in the automobile, and an absence state of the user in the automobile.

13. The storage medium of claim 10, comprising computer instructions for:

measuring a voltage at the accessory port; and detecting the disengaged state of the vehicle engine upon the voltage falling below a threshold.

14. The storage medium of claim 10, comprising computer instructions for:

monitoring an engagement state of the charging system with the charger; and alerting the user when the act of departure is detected and the device remains engaged with the charger.

15. The storage medium of claim 10, comprising computer instructions for monitoring from the interface a transition from a closed state of a door in the vehicle to an open state of the door as an indication of the act by the user to exit the vehicle.

* * * * *